United States Patent [19]

Nakamura et al.

[11] Patent Number: 5,088,023
[45] Date of Patent: Feb. 11, 1992

[54] INTEGRATED CIRCUIT HAVING PROCESSOR COUPLED BY COMMON BUS TO PROGRAMMABLE READ ONLY MEMORY FOR PROCESSOR OPERATION AND PROCESSOR UNCOUPLED FROM COMMON BUS WHEN PROGRAMMING READ ONLY MEMORY FROM EXTERNAL DEVICE

[75] Inventors: Hideo Nakamura, Tokyo; Terumi Sawase, Sayama, both of Japan

[73] Assignee: Hitachi, Ltd., Tokyo, Japan

[21] Appl. No.: 358,523

[22] Filed: May 30, 1989

Related U.S. Application Data

[63] Continuation of Ser. No. 121,913, Nov. 17, 1987, abandoned, which is a continuation of Ser. No. 714,915, Mar. 22, 1985, abandoned.

[30] Foreign Application Priority Data

Mar. 23, 1984 [JP] Japan .................................. 59-54240

[51] Int. Cl.$^5$ .................................................. G06F 13/00
[52] U.S. Cl. .................................. 395/425; 364/232.8; 364/245.7; 364/925.6; 364/965.76; 364/DIG. 1; 364/DIG. 2
[58] Field of Search ............. 364/200, 900; 371/15, 371/21

[56] References Cited

U.S. PATENT DOCUMENTS

| | | | |
|---|---|---|---|
| 4,153,933 | 5/1979 | Blume, Jr. et al. | 364/200 |
| 4,156,926 | 5/1979 | Hartman | 364/900 |
| 4,314,353 | 2/1982 | Gunter et al. | 364/900 |
| 4,349,870 | 9/1982 | Shaw et al. | 364/200 |
| 4,357,703 | 11/1982 | Van Brunt | 371/15 |
| 4,382,279 | 5/1983 | Ugon | 364/200 |
| 4,532,587 | 7/1985 | Roskell et al. | 364/200 |
| 4,546,472 | 10/1985 | Volk et al. | 371/15 |
| 4,555,783 | 11/1985 | Swanson | 371/15 |
| 4,556,840 | 12/1985 | Russell | 371/15 |
| 4,567,561 | 1/1986 | Wyatt et al. | 364/200 |
| 4,586,131 | 4/1986 | Caudel et al. | 364/200 |
| 4,604,692 | 8/1986 | Murakami | 364/200 |
| 4,644,496 | 2/1987 | Andrews | 364/900 |
| 4,667,285 | 5/1987 | Suzuki et al. | 364/200 |
| 4,670,838 | 6/1987 | Kawata | 364/200 |
| 4,680,698 | 7/1987 | Edwards et al. | 364/200 |
| 4,718,037 | 1/1988 | Thaden | 364/900 |

FOREIGN PATENT DOCUMENTS

| | | |
|---|---|---|
| 0111399 | of 0000 | European Pat. Off. . |
| 0062431 | 10/1982 | European Pat. Off. . |
| 0082682 | 6/1983 | European Pat. Off. . |
| 80-02881 | 12/1980 | PCT Int'l Appl. . |

OTHER PUBLICATIONS

SEEQ Advance Data Sheet, "Self Adaptive E$^2$ROM Single Chip Microcomputer", 2/1983, pp. 1–5.
Intel Data Sheet, "8048/8648/8748/8035", Single Component 8-Bit Microcomputer, pp. 8-22 to 8-31.
Motorola Catalog for MC68705 113, pp. 2, 16, 17.
Hagiwara et al. "A Single Chip Microcomputer with Real-Time Rewritable Nonvolatile Data Storage", 1981 IEEE International Solid State Circuit Conference, pp. 222–223.
Carter et al., "8 and 16 Bit Processor Family Keep Pace with Fast RAMS", Electronic Design, 4/28/1983, pp. 215–221.
Bagula et al., "A 5-V Self-Adaptive Microcomputer with 16 Kb of E$^2$Program Storage and Security", 1983 IEEE International Solid State Circuit Conference, pp. 34–35.

Primary Examiner—Thomas C. Lee
Assistant Examiner—Richard Lee Ellis
Attorney, Agent, or Firm—Antonelli, Terry, Stout & Kraus

[57] ABSTRACT

The present invention discloses an integrated circuit having a data bus, an address bus, a processor and a memory each connected to the data bus and the address bus, a first transmitter for transmitting data inputted to a data terminal to the data bus, a second transmitter for transmitting data on the data bus to the data terminal, a third transmitter for transmitting an address inputted to an address terminal to the address bus, and signal generate means for generating signals to set the respective outputs from the first and third transmitters to the high impedance in response to a memory read request supplied from the processor, for generating signals to set the respective outputs from a data output of memory module to transmit data from the memory to the data bus, the first transmitter, and the third transmitter to the high impedance in response to a memory write request, for generating signals to set the respective outputs from a data output of processor module and an address output of processor module to output data and an address from the processor to the data bus and the address bus, respectively to the high impedance in response to a memory read request from an external device, and for generating signals to set the respective outputs from the data output of processor module and the address output of processor module in response to a memory write request from an external device, the integrated circuit further including a fourth transmitter for transmitting an address on the address bus to the address terminal, wherein the signal generate means generates signals to set the outputs from the first and third transmitters to the high impedance in response to an external memory read request supplied from the processor, sets the respective outputs from the data output of memory module, the first transmitter, and the third transmitter to the high impedance in response to an external memory write request supplied from the processor, and responds to the read or write request from the external device in preference to the read or write request from the processor.

10 Claims, 4 Drawing Sheets

INTEGRATED CIRCUIT HAVING PROCESSOR COUPLED BY COMMON BUS TO PROGRAMMABLE READ ONLY MEMORY FOR PROCESSOR OPERATION AND PROCESSOR UNCOUPLED FROM COMMON BUS WHEN PROGRAMMING READ ONLY MEMORY FROM EXTERNAL DEVICE

This application is a continuation of application Ser. No. 121,913, filed Nov. 17, 1987, now abandoned, which is a continuation of application Ser. No. 714,915, filed Mar. 22, 1985, now abandoned.

BACKGROUND OF THE INVENTION

The present invention relates to an integrated circuit having a processor and or integrated memory to be suitably accessed from an external device and a system utilizing the integrated circuit.

Conventionally, in a single-chip microcomputer (MC68705R 3: Motorola; Prior art example 1) comprising an integrated nonvolatile memory, memory addresses are sequentially supplied to the integrated memory based on the memory address beforehand set in a bootstrap or the like under control of CPU disposed in the large scale integrated circuit (to be referred to as LSI herebelow) and data externally inputted is stored in an area of the memory at the specified address or data is outputted therefrom to an external device.

In the prior art example 1, the address of the integrated memory is supplied by the control section of the CPU, hence an external device cannot access an arbitrary memory area by specifying its memory address.

In another microcomputer (8749: Intel; Prior art example 2), a CPU disposed in the LSI comprises an internal bus shared among an internal memory, processing elements, an instruction register, a status register, a timer and counter, and a program counter, wherein a memory address externally specified for the internal memory is supplied from the program counter of the CPU connected to the internal bus and the data is accessed therethrough.

In the prior art example 2, the internal bus of the CPU is operated in a time shared manner to access the memory address and data. Control of the time-shared internal bus includes functions such as a function for discriminating information from other circuits from the memory address and data, a function for inhibiting the other circuits to access the internal bus while the data in an area at the specified memory address is being accessed, and a function for synchronizing the input/output of an external data, for example, for executing the input/output of the data whose length is at least four times the internal clock.

Consequently, in order to access the internal memory from an external device, it is required to operate an internal logic of the CPU and to execute the input/output of the memory address and data with the external device under conditions which satisfy the internal logic.

When a memory integrated in a single-chip microcomputer is accessed from an device externally located with respect to the LSI as described above, it is necessary to operate the internal logic of the CPU and to match the timing in the prior art example 2; therefore, discrete memory LSI's, for example, memory programming equipments such as EPROM programmers in which data is stored by specifying an arbitrary memory address cannot be utilized, which leads to a problem that a customized memory programming equipment satisfying the interface conditions for the operation of the logic in the CPU is required.

In addition, when a configuration, for example, a distributed processing system for executing an independent job in each LSI or a multiprocessor system with a common data base is processed by use of a plurality of LSI's, it is necessary to operate the internal logic of the CPU and to match the timing in the prior art example 2, hence an external control mechanism must be added to the LSI, which brings forth a problem that the conditions for interfacing the LSI become more complicated.

SUMMARY OF THE INVENTION

An object of the present invention is to provide an integrated circuit comprising a processor and a memory which allows an external device to access the internal memory thereof in the same manner as to assecess a discrete memory, thereby overcoming above-mentioned problems.

Another object of the present invention is to provide a system constructed by use of an integrated circuit including a processor and a memory therein so as to be accessed from other integrated circuits In order to achieve these objects, according to the present invention, there is provided an integrated circuit comprising a data bus, an address bus, a processor and a memory each connected to said data bus and said address bus, a first transmitter for transmitting data inputted to a data terminal to said data bus, a second transmitter for transmitting data on said data bus to the data terminal, a third transmitter for transmitting an address inputted to an address terminal to said address bus, and signal generate means for generating signals to set the respective outputs from said first and third transmitters to the high impedance in response to a memory read request supplied from said processor, for generating signals to set the respective outputs from a data output of memory module to transmit data from said memory to said data bus, the first transmitter, and the third transmitter to the high impedance in response to a memory write request, for generating signals to set the respective outputs from a data output of processor module and an address output of processor module to output data and an address from said processor to said data bus and said address bus, respectively to the high impedance in responce to a memory read request from an external device, and for generating signals to set the respective outputs from the data output of processor module and the address output of processor module to the high impedance in response to a memory write request from an external device; said integrated circuit further comprising a fourth transmitter for transmitting the address on said address bus to said address terminal; wherein said signal generate means generates signals to set the outputs from said first and third transmitters to the high impedance in response to an external memory read request supplied from said processor, sets the respective outputs from said data output of memory module, the first transmitter, and the third transmitter to the high impedance in response to an external memory write request supplied from said processor, and responds to the read or write request from the external device in preference to the read or write request from said processor.

According to a additional feature of the present invention, there is provided a configuration including at least an integrated circuit of the first invention and another integrated circuit having an internal processor for controlling the integrated circuit of the first invention and which issues an access request thereto so as to access an internal memory thereof, thereby allowing easily implementing a system comprising a plurality of processors.

BRIEF DESCRIPTION OF THE DRAWINGS

The present invention will be apparent from the following detailed description taken in conjunction with the accompanying drawings, in which.

DESCRIPTION OF THE PREFERRED EMBODIMENTS

An embodiment of the present invention will be described in detail by referring to the accompanying drawings.

Figure 1:
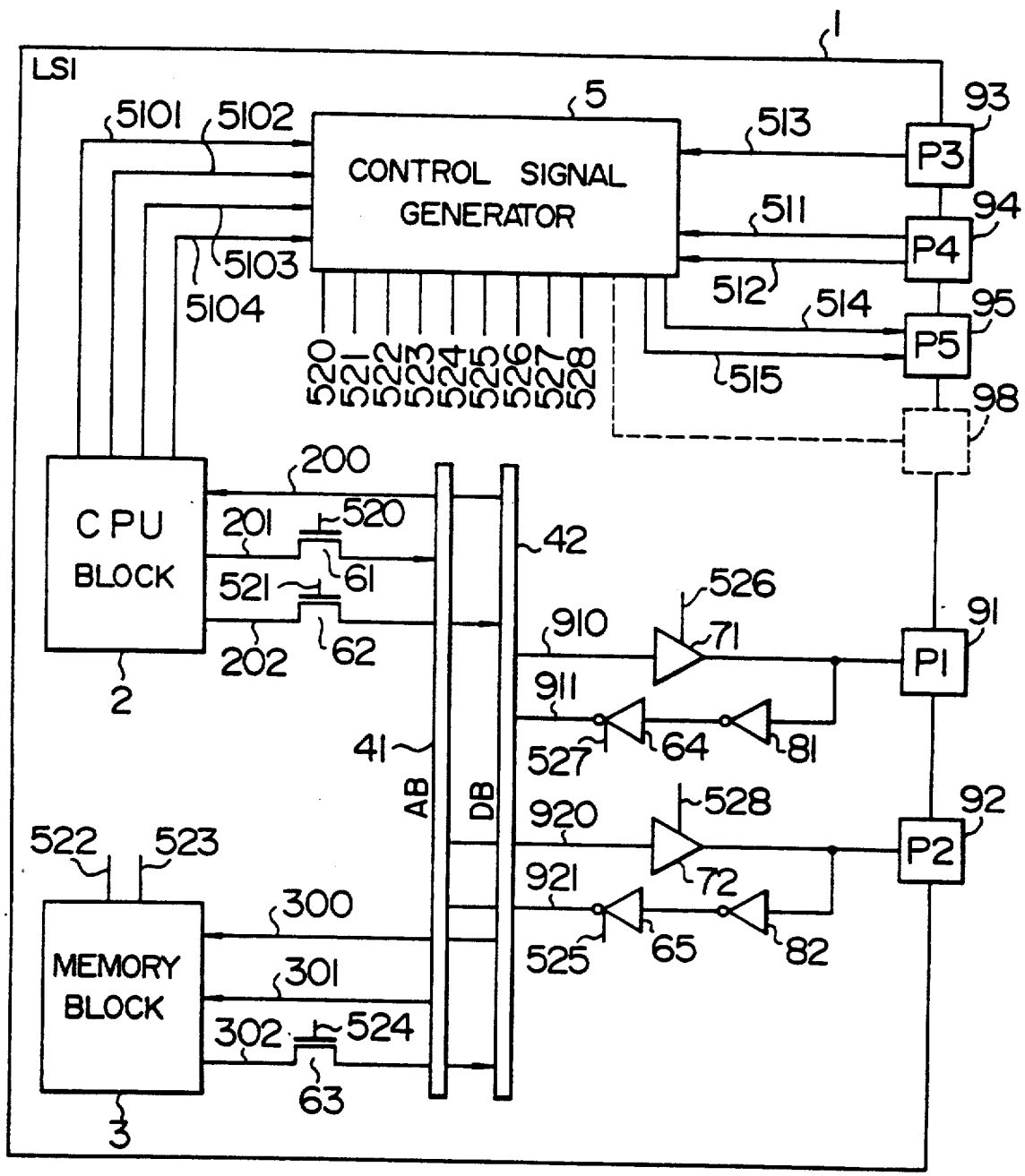
FIG. 1 is the schematic block diagram illustrating a microcomputer formed as an LSI and representing an embodiment of the present invention.

FIG. 1 is a schematic block diagram of a microcomputer in the form of an LSI and representing one embodiment in accordance with the present invention. This circuit configuration includes an LSI 1 having a CPU block 2, a memory block 3, an address bus (AB) 41, a data bus (DB) 42, a control signal generator 5, external terminals (P1 to P5) 91-95, an address gate circuit 61 for controlling transfer of address signals from the CPU block 2 to the address bus (AB) 41 and which opens or closes in accordance with a control signal 520 from the control signal generator 5, a data gate circuit 62 for controlling the transfer of data from the CPU block 2 to the data bus (DB) 42 and which opens or closes in accordance with a control signal, 521 from the control signal generator 5, a data gate circuit 63 for outputting data from the memory block 3 to the data bus (DB) 42 and which opens or closes in accordance with a control signal 524 from the control signal generator 5, a data gate circuit 64 for controlling transfer of data from the data terminal (P1) 91 to the data bus (DB) 42 based on data obtained via an inverter 81 and which opens or closes in accordance with a control signal 527 from the control signal generator 5, an address gate circuit 65 for controlling transfer of address signals from the external terminal (P2) 92 to the address bus (AB) 42 by restoring the information inverted by an inverter 82 and which opens or closes in accordance with a control signal from the control signal generator 5, a data gate circuit 71 for controlling transfer of data from the data bus (DB) 42 to the external terminal (P1) 91 and which opens or closes in accordance with a control signal from the control signal generator 5, and an address gate circuit 72 for controlling transfer of an address from the address bus (AB) 41 to the external terminal (P2) 92 and which opens or closes in accordance with a control signal 528 from the control signal generator 5.

The inverters 81 and 82 are serially connected to the data and address gate circuits 64 and 65, wherein the gate size of each inverter is selected to be small so as to configure a bus driver having a level sense function for preventing a direct current. The address gate circuits 61 and 65 and the data gate circuits 62, 63, and 64 are blocked when the control signal from the control signal generator 5 is at the low ("L") level (high impedance), while they are conductive when the control signal is at the high ("H") level, thereby preventing the information signals ("H" and "L") outputted to the address bus (AB) 41 and the data bus (DB) 42 from colliding with each other.

In addition, the address and data output circuits 61 and 62 may be disposed in the CPU block 2, while the data gate circuit 63 may be integrated in the memory block 3.

The CPU block 2 comprises an address output line 201 for outputting address to the address bus (AB) 41, a data input line 200 for receiving data from the data bus (DB) 42, and a data output line 202 for transmitting data to the data bus (DB) 42. The CPU block 2 transmits access control signals 5101-5104 to the control signal generator 5 for accessing the memory block 3 and external devices (for example, a memory) connected to the external terminal (P1) 91 and external terminal (P2) 92. The memory block 3 includes an address input line 301 for receiving an address from the address bus (AB) 41, a data input line 300 for receiving data from the data bus (DB) 42, and a data output line 302 for transmitting data to the data bus (DB) 42. Read and write accesses with respect to the memory block are controlled by memory block control signals 522 and 523 generated by the control signal generator 5. The external terminal (P1) 91 is a port for executing data transmission and reception with a device located externally with respect to the LSI 1 and is coupled to a data line 910 for transmitting data from the data bus (DB) 42 and a data receiver 911 for supplying data to the data bus (DB) 42. An external terminal (P2) 92 is a port for executing address transmission and reception with a device located externally with respect to the LSI 1 and is coupled to an address line 920 for transmitting an address from the address bus (AB) 41 and an address line 921 for supplying an address to the data bus (DB) 42.

Consequently, the LSI 1 under control of the CPU 2 has a function for executing data input and output between the memory block 3 and a device located externally with respect to the LSI 1 and a function for directly executing read/write operations between a device located externally with respect to the LSI 1 and the memory block 3 in the LSI 1 independently of the function of the CPU block 2.

Figure 2:
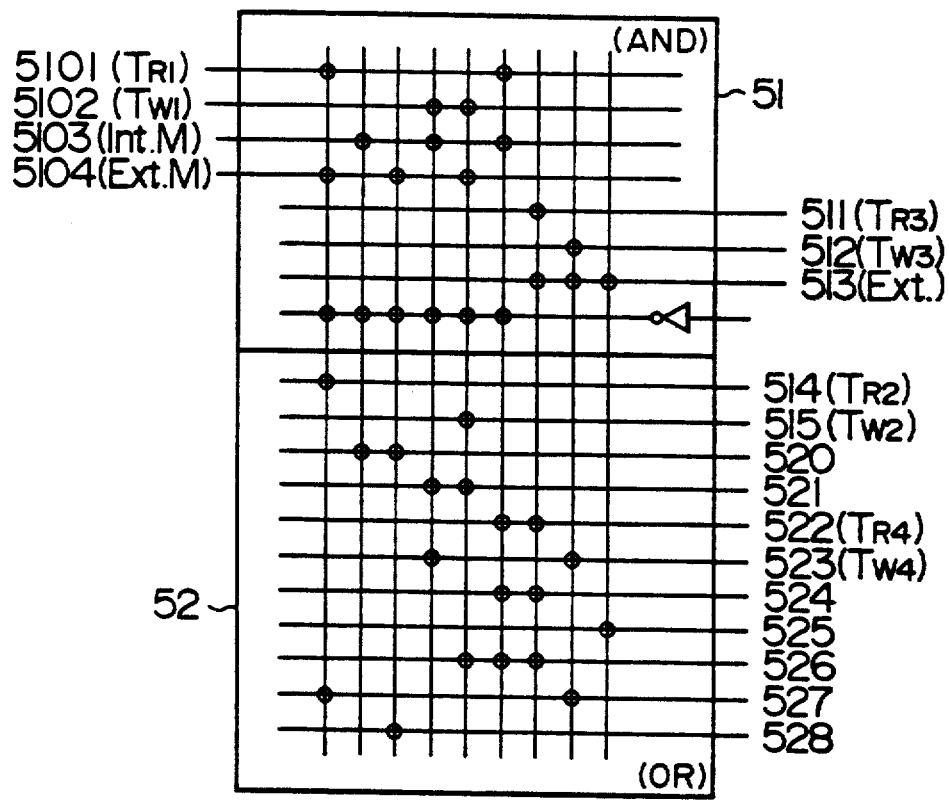
FIG. 2 is a schematic circuit diagram depicting an example of a control signal generator 5 of FIG. 1.

FIG. 2 is a schematic circuit diagram illustrating an example of the control signal generator 5. In this example, the control signal generator 5 is constructed as a programmable logic array (PLA) and generates access control signals from the CPU block 2 to the memory such as control signals 520, 525, and 528 for controlling the address bus (AB) 41, control signals 521, 524, 526, and 527 for controlling the data bus (DB) 42, and control signals 522 and 523 for controlling the memory block 3, and control signals 514 and 515 for controlling devices located externally with respect to the LSI 1 in response to the inputs of the read timing, write timing, and internal memory specify signals 5101, 5102, and 5103; and the mode signal 513, read signal 511, and write signal 512 for the memory block 3, respectively inputted from a device located outside the LSI 1.

When the mode signal 513 specifies the external mode, the control signal generator 5 blocks the control signals 5101-5104 from the CPU block 2, thereby controlling a request supplied from a device located externally with respect to the LSI 1 to be preferentially executed.

The control signal generator 5 operates as follows depending on the state of the mode signal 513.

(I) When the mode signal 513 specifies the external mode:

The control signals 5101-5104 from the CPU block 2 are blocked, the control signals 511 and 512 from the external terminal (P4) 94 are set to be active, and the control signals 522 and 523 are generated for the memory block 3.

(II) When the mode signal 513 does not specify the external mode:

(1) When an external memory outside the LSI 1 is accessed under control of the CPU block 2:

The control signals 514 and 515 are generated for the external terminal (P5) 95 in accordance with the control signals 5102 and 5104 from the CPU block 2.

(2) When the memory block 3 is accessed under control of the CPU block 2:

The control signals 522 and 523 are generated for the memory block 3 in accordance with the control signals 5101, 5102, and 5103 from the CPU block 2.

Next, an operation example of the LSI 1 will be described in which the memory block 3 is directly accessed from the external terminals (P1) 91 and (P2) 92. First, the mode specification of the LSI 1 is set to the external mode by use of the external terminal (P3) 93. Then, an address of an access area in the memory block 3 is inputted from the external terminal (P2) 92, and a memory read/write signal is inputted from the external terminal (P4) 94. For a write operation, the write data is inputted to the external terminal (P1) 91.

In the control signal generator 5, when the mode signal 513 inputted from the external terminal (P3) 93 is identified to specify the external mode, the control signals 520 and 521 for controlling the address gate circuit 61 and the data gate circuit 62, respectively are set to the "L") level so as to inhibit an address and data from being outputted from the CPU block 2 to the address bus (AB) 41 and data bus (DB) 42, respectively At the same time, the control signal 525 for controlling the address gate circuit 65 is set to the "H" level in order to supply an address information from the external terminal (P2) 92 to the memory block via the address input line 921, the address bus (AB) 41, and the address input line 301.

When the write signal 512 is specified to the input of the external terminal (P4) 94, the control signal generator 5 sets the control signal 527 for controlling the data bus (DB) 42, and the data information supplied to the external terminal (P1) 91 is delivered to the memory block via the data input line 911, the data bus (DB) 42, and a data input line 300. At the same time, a write signal is supplied for the memory block control signal 523 and the data is thus written in the memory block 3.

When the read signal 511 is specified to the input of the external terminal (P4) 94, the control signal generator 5 sets the data bus control signal 527 to the "L" level and the data bus control signals 526 and 524 to the "H" level and supplies the read signal 522 to the memory block 3. As a result, the data read from the memory block 3 is delivered to the external terminal (P1) 91 vis the data output line 302, the data bus (DB) 42, and the data output line 910. When a read/write operation from an external device is taking place for the memory block 3 in the LSI 1, a data transmission from the CPU block 2 to the address bus (AB) 41 and the data bus (DB) 42 is inhibited, thereby allowing the LSI 1 to be accessed in the same manner as to access a discrete memory unit.

As compared with the prior art procedure for executing a data input/output operation between the memory block 3 and external terminals under control of the CPU block 2, the processing procedure described hereabove realizes a higher data transfer speed because the transfer operation is executed independently of the CPU block 2 and brings forth an effect that the interface for accessing the memory in the LSI 1 from an external device can be shared with a discrete memory LSI.

The memory block 3 may be a random access memory (RAM), a nonvolatile memory, or the like, that is, a memory that can be formed on the same LSI containing the CPU block 2 need only be connected.

Next, the memory control timing and an operation example of the control signal generator 5 in a microcomputer LSI comprising an ultraviolet ray erasable nonvolatile memory will be described in the following paragraphs.

Figure 3:
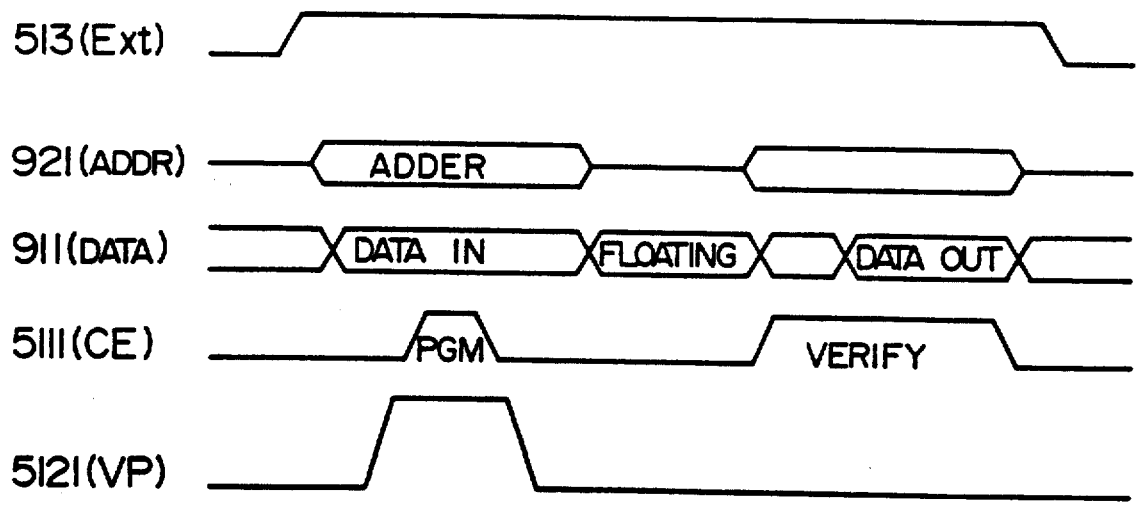
FIG. 3 is a timing chart illustrating an example of the access timing for accessing a nonvolatile memory.
Figure 4:
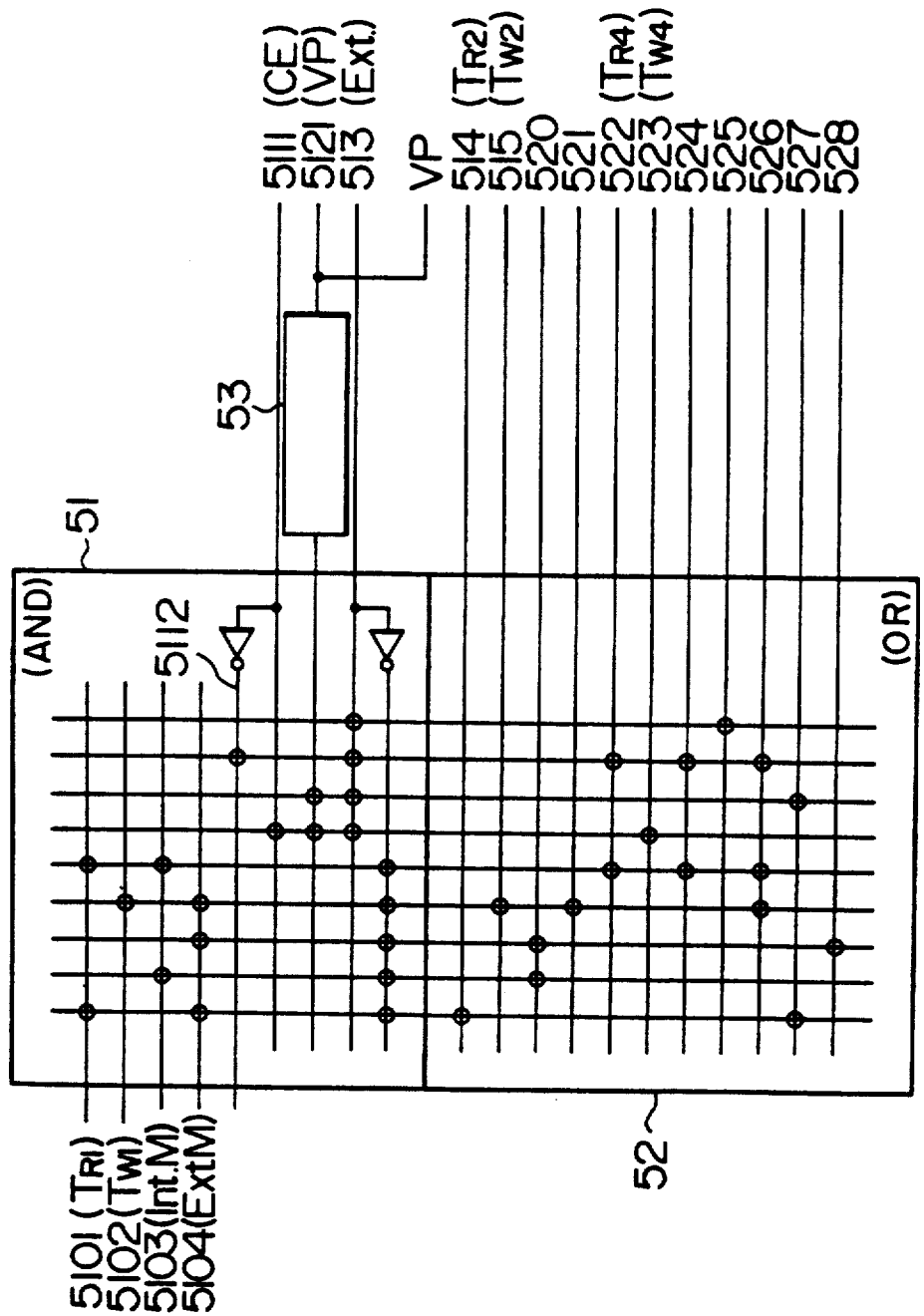
FIG. 4 is a schematic circuit configuration diagram showing an example of the control signal generator comprising a nonvolatile memory.

FIG. 3 is a timing chart for accessing a nonvolatile memory. FIG. 4 is a schematic circuit diagram illustrating an operation example of the control signal generator 5 for use with a nonvolatile memory.

For a write operation in the nonvolatile memory, a write voltage 5121 having a high potential and a signal 5121 for providing the program and verify enable timing are supplied together with the mode signal 513, information about the address input line 921, and information about the data input line 911. The high-potential voltage is converted to be of the same signal level as other signals by a level exchange circuit 53 and is inputted to the control signal generator 5, while a program and verify enable timing signal 5111 is inputted thereto together with an inverted signal 5112.

The conditions for generating the control signals in the control signal generator 5 are almost the same as explained in conjunction with the circuit diagram of FIG. 2.

The write signal 523 for providing the write timing of the internal memory block 3 is generated only when the signal 5111 for providing the program and verify enable timing and the high voltage signal 5121 are at the "H" level with the mode signal 513 set to the external mode specification. The high-voltage signal 5121 is also supplied directly to the memory block 3 in the nonvolatile memory so as to be utilized as a write power supply. The read signal for providing a read timing is generated in accordance with a read timing signal 5101 from the CPU block 2 for accessing the internal memory block 3 and the external verify condition. The timing conditions of FIG. 3 are the same as those of a discrete nonvolatile memory.

As for the timing signals of FIG. 3 under the external mode condition in the LSI 1 of the present invention, the data, address, write voltage, and program and verify timing signals are directly supplied to the memory block by use of the control signals generated by the control signal generator 5 of FIG. 4, thereby allowing an access under the same conditions as for accessing a discrete unvolatile memory LSI.

As a result, signals generated by a write device for writing data in a discrete nonvolatile memory can be directly utilized for the externally supplied information about the address input line 921, information about the data receiver, program and verify enable timing 5111, and high-voltage signal 5121, that is, the write device can be commonly used.

As can be seen from the description above, the integrated CPU block 2 is electrically separated from the internal address bus (AB) 41 and data bus (DB) 42 in the external mode, and the address bus (AB) 41 and the data bus (DB) 42 are configured to be directly connected to the integrated memory block 3 via the external terminal; hence a test of the integrated memory block 3, for example, can be conducted as the same test for the discrete memory LSI independently of the test of the CPU block 2, thereby improving the test efficiency such that the test data can be advantageously accumulated, the test program can be independently developed, and the test units can be commonly utilized.

Figure 5:
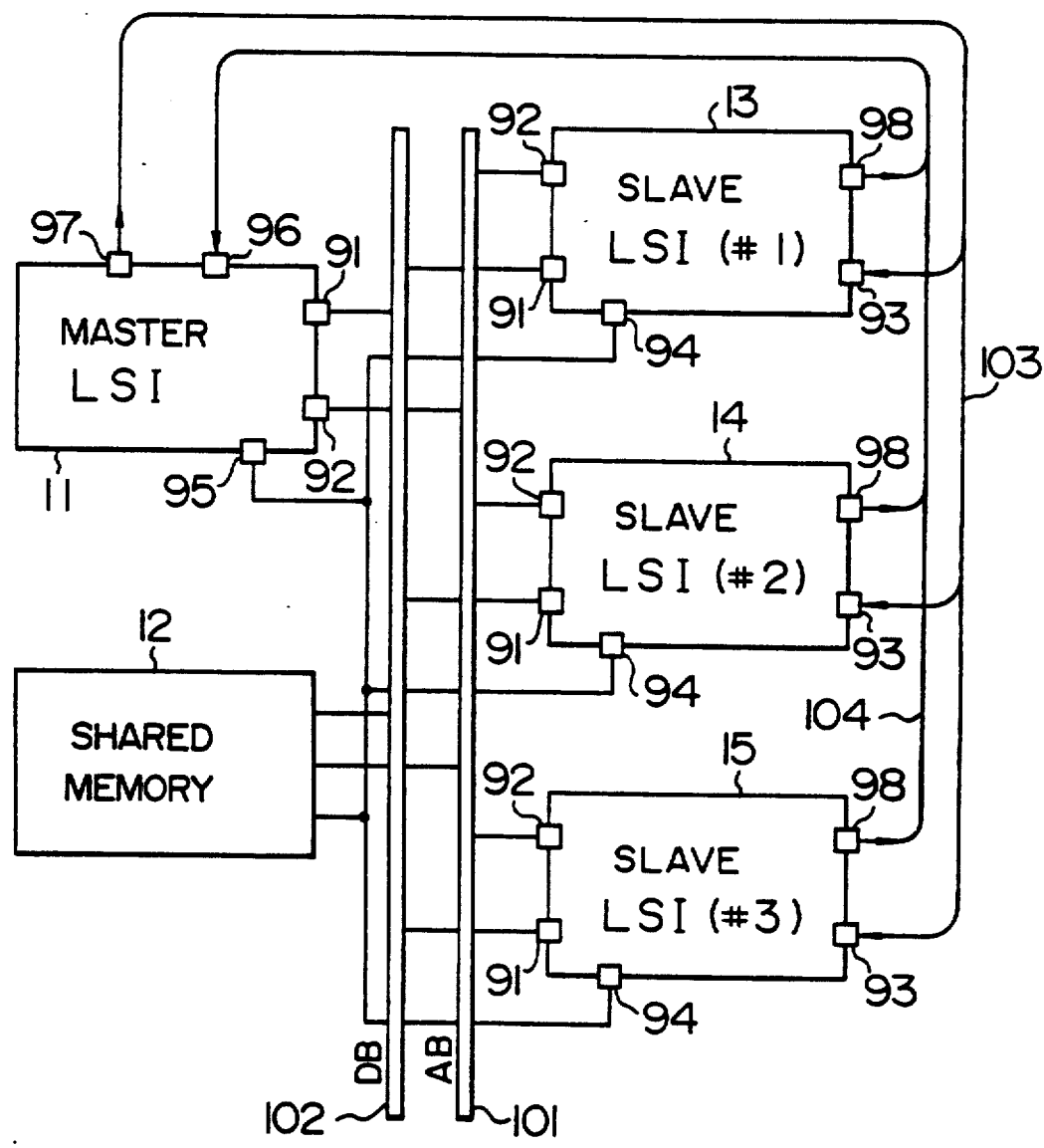
FIG. 5 is a system configuration diagram illustrating a multi-CPU system utilizing a plurality of LSI's in accordance with the present invention.

FIG. 5 is an example of a multi-CPU system utilizing a plurality of LSI's forming an embodiment of the present invention.

The circuit configuration of FIG. 5 comprises a master LSI 11 which has been illustrated as an embodiment, a shared memory 12, and LSI's 13-15 each comprising a CPU and a memory according to the embodiment and which are slave LSI's #1 to #3 each comprising a slave CPU and a slave memory in FIG. 5.

The master LSI 11 and the slave LSI's (#1 to #3) 13-15 include a data terminal 91, an address terminal 92, an input terminal 94 of the internal memory read/write signal, an output terminal 95 of the external memory read/write signal, and a mode input terminal 93. These terminals correspond to the external terminals 91-95, respectively of the LSI of before-stated embodiment. In addition, the circuit configuration includes an input terminal 96 for inputting a status data signal from the slave LSI's (#1 to #3) 13-15 to the master LSI 1, an output terminal 97 for indicating a control mode from the master LSI 1 to the slave LSI's (#1 to #3) 13-15, and an output terminal for outputting a status signal from the slave LSI's (#1 to #3) 13-15 to the master LSI 1. As compared with the LSI illustrated as an embodiment in FIG. 1, the status output terminal 98 is added to each slave LSI (#1 to #3) 13-15 (shown by use of dotted lines in FIG. 1).

In addition, the master LSI 1 is implemented by adding the input and output terminals 96 and 97 to the LSI illustrated as an embodiment in FIG. 1. The circuit configuration further comprises an address bus (AB) 101, a data bus (DB) 102, a mode control signal line 103, and an output line 104 for outputting the status of the slave LSI's (#1 to #3) 13-15.

The slave LSI's (#1 to #3) 13-15 each independently operates by using programs and data stored in the memory of the respective LSI and can execute an operation, for example, to modify a portion of the programs on data.

The following paragraphs describe an operation example of the slave LSI's (#1 to #3) 13-15.

In order to transfer data from the shared memory 12 to, for example, the memory in the slave LSI (#1) 13, the slave LSI (#1) 13 outputs an information for updating the shared memory 12 to the status output terminal 98 of the slave LSI (#1) 13, then the information is delivered to the master LSI 1 via the status output signal line 104. Based on the information inputted to the input terminal 96, the master LSI 1 outputs a mode signal from the port output terminal 97 to the mode input terminal 93 of the slave LSI (#1) 13 in order to set the slave LSI (#1) 13 to the external mode. Next, the master LSI 1 outputs a write signal from the output terminal thereof via the input terminal 94 of the slave LSI (#1) 13 and sends the address and data information of the shared memory 12 to the address and data terminals 92 and 91, respectively of the slave LSI (#1) 13. Based on the information inputted from each terminal, the slave LSI (#1) 13 performs the same operation as that of the LSI embodying the present invention, thereby updating the internal memory.

That is, the same access control as applied to the shared memory 12 can be utilized to transfer data to the internal memories of the slave LSI's (#1 to #3) 13-15.

The external mode state is released after the data is completely transferred, and the specified LSI resumes its operation independently of the slave LSI (#1) 13. During the external mode state, the CPU integrated in the slave LSI (#1) 13 is prevented from accessing the internal memory, hence the data being updated in the internal memory of the slave LSI (#1) 13 cannot be used by the master LSI 1.

The same accessing procedure also applies to a data read operation from the internal memories of the slave LSI's (#1 to #3) 13-15 embodying the present invention to the shared memory 12.

The master LSI 1 may be an LSI which is different from the LSI comprising only a CPU as shown in FIG. 1. In this configuration, the CPU in the slave LSI need only execute data processing in the same way as for accessing information stored in a memory integrated in the same LSI independently of the state of the devices and integrated CPU's of the other slave LSI's.

Consequently, a distributed processing system can be easily implemented in which jobs are assigned to the respective CPU's depending on the purposes thereof. In addition, controls such as to allocate job programs and data base are performed by the master LSI, hence the slave LSI's can be separated therefrom, which facilitates a multi-CPU system construction.

The LSI described as the embodiment of the present invention can be regarded as an LSI obtained by adding some logic functions to a memory LSI of the prior art, so it can also be utilized as a memory having a high-reliability or as an intelligent memory by allowing the integrated CPU thereof to execute various processing such as internal memory checks and data work and rearrangement.

In accordance with the present invention, an internal memory can be separated from the internal CPU and can be thus accessed under the same interface conditions as for a discrete memory LSI by specifying the external mode state from a part controlling the LSI mode, thereby facilitating a device located externally with respect to the LSI to access the memory integrated therein. Moreover, various systems such as a distributed processing system in which job are assigned to the respective CPU's depending on the purpose thereof can be implemented by combining the LSI's implemented by the present invention. In addition, since the allocation controls for allocating job programs and data base are conducted by the master LSI, the slave LSI's can be separated therefrom and a multi-CPU system can be thus easily configured.

We claim:

1. A microcomputer implemented as an LSI and having a CPU block and an electrically programmable read only memory which is programmable by an external device, said microcomputer comprising:

bus means for transferring data and address signals;

a CPU block for processing data according to instructions;

a memory block for storing instructions, said memory block having at least said electrically programmable memory;

first terminal means for connecting to an external device;

first gate means for controlling transfer of data and address signals from said bus means to said first terminal means;

second gate means for controlling transfer of data and address signals from said first terminal means to said bus means;

first transfer means for transferring data from said bus means to said CPU block;

second transfer means for transferring data and address signals from said bus means to said memory block;

third gate means for controlling transfer of data and address signals from said CPU block to said bus means;

fourth gate means for controlling transfer of data from said memory block to said bus means;

second terminal means for receiving an external signal for effecting writing of data in said electrically programmable memory means from said external device; and control means responsive to control signals received from said CPU block for controlling said first through fourth gate means to provide for transfer of instructions from said memory block to said CPU block for effecting processing of data by said CPU block, and responsive to said external signal received from said second terminal means for forcibly controlling at least said third gate means to cut-off transfer of data and address signals from said CPU block to said bus means so as to provide for transfer of data and address signals from said first terminal means to said electrically programmable memory via said bus means to effect programming thereof independent of said CPU block.

2. A microcomputer according to claim 1, wherein said control means includes means responsive to said signals received from said second terminal means for blocking said control signals from said CPU block.

3. A microcomputer according to claim 1, wherein said control means is implemented as a programmable logic array.

4. A microcomputer according to claim 1, wherein said electrically programmable read only memory is an ultra-violet ray erasable nonvolatile memory.

5. A microcomputer implemented as an LSI device comprising:

a CPU block;

a memory block for storing instructions at selected addresses of said memory block and including an electrically programmable memory which is programmable by an external device independently of said CPU block;

an address bus having a plurality of address lines for transferring addresses from said CPU block to said memory block;

a data bus having a plurality of data lines for transferring data between said CPU block and said memory block;

first terminal means for coupling said address bus to said external device;

second terminal means for coupling said data bus to said external device;

coupling means for selectively coupling said data bus and said address bus to said CPU block; and control means coupled to said coupling means and an external terminal for controlling said coupling means to uncouple said CPU block from said address bus and said data bus when an external access mode signal is received via said external terminal to effect programming of said electrically programmable memory by said external device independently of said CPU block via said first terminal means and said second terminal means;

wherein programming of said electrically programmable memory from said external device can be performed via said address bus and said data bus.

6. A microcomputer according to claim 5, wherein said external device is an EPROM programmer which generates addresses and corresponding data.

7. A microcomputer according to claim 5, wherein said external terminal is coupled to said control means for supplying to said control means a mode control signal, said CPU block is coupled to said control means for supplying to said control means a access control signal, and said control means blocks said access control signal from said CPU block when said mode control signal specifies an external access mode.

8. A microcomputer according to claim 7, wherein said control means enables said CPU block to access said memory block in accordance with said access control signal when said mode control signal specifies an internal access mode.

9. A microcomputer according to claim 5, wherein said control means includes control signal generating means which is implemented as a programmable logic array.

10. A microcomputer according to claim 5, wherein said electrically programmable memory is an ultra-violet ray erasable nonvolatile read only memory.

* * * * *